(12) United States Patent
    Zhao et al.

(10) Patent No.: US 9,667,519 B2
(45) Date of Patent: May 30, 2017

(54) METHOD, DEVICE, AND SYSTEM FOR ACQUIRING COST BETWEEN NODES

(71) Applicant: HUAWEI TECHNOLOGIES CO., LTD., Shenzhen (CN)

(72) Inventors: Yuping Zhao, Nanjing (CN); Jian Chen, Nanjing (CN); Hong Zhou, Nanjing (CN); Rong Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 14/078,992

(22) Filed: Nov. 13, 2013

(65) Prior Publication Data

US 2014/0068072 A1    Mar. 6, 2014

Related U.S. Application Data

(63) Continuation of application No. PCT/CN2012/075058, filed on May 4, 2012.

(30) Foreign Application Priority Data

Jul. 14, 2011    (CN) .......................... 2011 1 0197448

(51) Int. Cl.
    *H04L 12/715*    (2013.01)
    *H04L 12/751*    (2013.01)
    (Continued)

(52) U.S. Cl.
    CPC .......... *H04L 43/0876* (2013.01); *H04L 45/02* (2013.01); *H04L 45/04* (2013.01); *H04L 67/104* (2013.01); *H04L 67/1023* (2013.01); *H04L 67/02* (2013.01)

(58) Field of Classification Search
    CPC ........ H04L 45/00-45/50; H04L 45/745; H04L 67/1002-67/104
    See application file for complete search history.

(56) References Cited

U.S. PATENT DOCUMENTS 7,319,700 B1*    1/2008    Kompella ............... H04L 45/02
                                                           370/227
8,169,916 B1*    5/2012    Pai ..................... H04N 21/2181
                                                           370/236
(Continued)

FOREIGN PATENT DOCUMENTS

CN    101997922    3/2011
CN    102055808    5/2011
CN    102255811    11/2011

OTHER PUBLICATIONS

Extended European Search Report issued on Jun. 2, 2014 in corresponding European Patent Application No. 12 79 2889.
(Continued)

*Primary Examiner* — Wing F Chan
*Assistant Examiner* — Raji Krishnan
(74) *Attorney, Agent, or Firm* — Staas & Halsey LLP (57) ABSTRACT

Embodiments of the present invention disclose a method, a device, and a system for obtaining a cost between nodes. The method includes: receiving, by a first server, a first cost request message from a client, where the first cost request message includes a first source node list, a first candidate node list, and a cost type; and calculating a cost between each source node in the first source node list and each candidate node in the first candidate node list according to the cost type. Network traffic management and optimization are implemented by using the technical solutions provided in the embodiments of the present invention, in which a cost between nodes is acquired from servers hierarchically deployed by an Internet service provider ISP and used as a basis of node selection.

19 Claims, 3 Drawing Sheets

(51) Int. Cl.
*H04L 29/08* (2006.01)
*H04L 12/26* (2006.01)

(56) References Cited

U.S. PATENT DOCUMENTS

| | | | | |
|---|---|---|---|---|
| 2008/0031257 A1* | 2/2008 | He | ................... | H04L 12/2697 370/395.31 |
| 2008/0228940 A1* | 9/2008 | Thubert | ............ | H04L 29/12207 709/238 |
| 2009/0240758 A1* | 9/2009 | Pasko | ................... | H04L 67/104 709/201 |
| 2009/0257365 A1 | 10/2009 | Hwang et al. | | |
| 2010/0202448 A1 | 8/2010 | Previdi et al. | | |
| 2012/0039262 A1* | 2/2012 | Walsh | ................... | H04L 45/04 370/329 |
| 2012/0102223 A1* | 4/2012 | Zhang | ................... | H04L 45/04 709/239 |
| 2012/0213224 A1* | 8/2012 | Chen | ................... | H04L 45/04 370/390 |
| 2012/0239796 A1* | 9/2012 | Narasappa | ............. | H04L 45/02 709/224 |
| 2014/0068072 A1* | 3/2014 | Zhao | ................... | H04L 67/1023 709/224 |

OTHER PUBLICATIONS

Al-Mukaddim Khan Pathan and Rajkumar Buyya Ed—Hsu Ching-Hsien: "A Taxonomy and Survey of Content Delivery Networks", Journal of Systems Architecture, Elsevier BV, NL, Feb. 12, 2006 (Feb. 12, 2006), pp. 1-44, XP008110709.

Marco Conti et al: "Content Delivery Policies in Replicated Web Services: Client-Side vs. Server Side", Cluster Computing, Kluwer Academic Publishers, B0, vol. 8, No. 1, Jan. 1, 2005 (Jan. 1, 2005), pp. 47-60, XP019205399.

Fortino et al: "Using P2P, Grid and Agent 1-15 technologies for the development of content distribution networks", Future Generations Computer Sysrtems, Elsevier Science Publishers. Amsterdam, NL, vol. 24, No. 3, Nov. 6, 2007 (Nov. 6, 2007), pp. 180-190, XP022331676, ISSN: 0167-739X, DOI: 10.1016/J.FUTURE.2007. 06.007.

Gang Peng: "CDN: Content Distribution Network", Technical Report TR-125 of Experimental Computer Systems Lab in Stony Brook University, Nov. 18, 2004 (Nov. 18, 2004), XP055119336.

Barbir Nortel Networks B Cain Storigen Systems R Nair Consultant O Spatscheck AT&T A: "Known Content Network (CN) Request Routing Mechanisms; rfc3568.txt", Jul. 1, 2003, Jul. 1, 2003 (Jul. 1, 2003), XP015009350.

Elisa Turrini: "An architecture for Content Distribution Internetworking", Technical Report UBLCS-2004-1, Mar. 1, 2004 (Mar. 1, 2004), XP055119361, Department of Computer Science University of Bologna (Italy).

Xiaojuan Cai: "Racier—A Hierarchical Approach for Content Internetworking Through Interdomain Routing", A Thesis Submitted in Partial Fulfillment of the Requirements for the Degree of Master of Science, Sep. 1, 2002 (Sep. 1, 2002), XP055119492.

* cited by examiner

FIG. 5

METHOD, DEVICE, AND SYSTEM FOR ACQUIRING COST BETWEEN NODES

CROSS-REFERENCE TO RELATED APPLICATION

This application is a continuation of International Application No. PCT/CN2012/075058, filed on May 4, 2012, which claims priority to Chinese Patent Application No. 201110197448.3, filed on Jul. 14, 2011, both of which are hereby incorporated by reference in their entireties

TECHNICAL FIELD

Embodiments of the present invention relate to the network communications field, and in particular, to a method, a device, and a system for acquiring a cost between nodes.

BACKGROUND

In recent years, a content delivery network (Content Delivery Network, CDN) technology and a peer to peer network (Peer to Peer, P2P) technology have become two common content sharing and transfer technologies on the Internet.

SUMMARY

Generally, in an application based on CDN and P2P technologies, a network layer circumstance is not considered in node election, and network congestion and traffic jitter are easily caused by random and disorderly node election. As a result, for an Internet service provider (Internet Service Provider, ISP), a new traffic management problem arises. Though the ISP has tried to use many methods, the objective of managing and optimizing network traffic still cannot be achieved. In this case, the present invention provides a method, a device, and a system for acquiring a cost between nodes to resolve a problem of network traffic management and optimization that cannot be implemented in the prior art.

To resolve the technical problem, according to one aspect, the present invention provides a method for acquiring a cost between nodes, including:

receiving, by a first server, a first cost request message from a client, where the first cost request message includes a first source node list, a first candidate node list, and a cost type;

calculating a cost between each source node in the first source node list and each candidate node in the first candidate node list according to the cost type;

sending a second cost request message to a second server when the first server fails to complete the calculation of the cost between each source node in the first source node list and each candidate node in the first candidate node list, where the second cost request message includes a second source node list, a second candidate node list, and the cost type;

receiving a second cost response message from the second server, where the second cost response message includes a second cost list, and the second cost list includes a source node in the second source node list, a candidate node in the second candidate node list, and a corresponding cost; and calculating a first cost list according to the second cost list, and sending a first cost response message to the client, where the first cost response message includes the first cost list.

According to another aspect, the present invention provides a method for acquiring a cost between nodes, including:

receiving, by a first server, a first cost request message from a client, where the first cost request message includes a first source node list, a first candidate node list, and a cost type;

calculating a cost between each source node in the first source node list and each candidate node in the first candidate node list according to the cost type;

returning, by the first server, a first cost response message to the client, where the first cost response message includes a first cost list, and the first cost list includes a source node and a candidate node for which a cost can be calculated by the first server and a corresponding cost; and sending a redirection message to the client when the first server fails to complete the calculation of the cost between each source node in the first source node list and each candidate node in the first candidate node list, where the redirection message includes an identifier of a second server and a second source node list.

According to another aspect, the present invention provides a device for acquiring a cost between nodes, including a receiver, a calculating unit, and a sender, where:

the receiver is configured to receive a first cost request message from a client, where the first cost request message includes a first source node list, a first candidate node list, and a cost type;

the calculating unit is configured to calculate a cost between each source node in the first source node list and each candidate node in the first candidate node list according to the cost type; and the sender is configured to send a first cost response message to the client, where the first cost response message includes a first cost list, and the first cost list includes a source node in the first source node list, a candidate node in the first candidate node list, and a corresponding cost; and further configured to send a second cost request message to a second server, where the second cost request message includes a second source node list, a second candidate node list, and the cost type; or send a redirection message to the client, where the redirection message includes an identifier of the second server and a second source node list.

According to another aspect, the present invention provides a system for acquiring a cost between nodes, including a first server and a second server, where:

the first server is configured to receive a first cost request message from a client, where the first cost request message includes a first source node list, a first candidate node list, and a cost type; calculate a cost between each source node in the first source node list and each candidate node in the first candidate node list according to the cost type; and send a first cost response message to the client, where the first cost response message includes a first cost list, and the first cost list includes a source node in the first source node list, a candidate node in the first candidate node list, and a corresponding cost; and is further configured to send a second cost request message to the second server when the first server fails to complete the calculation of the cost between each source node in the first source node list and each candidate node in the first candidate node list, where the second cost request message includes a second source node list, a second candidate node list, and the cost type; or send a redirection message to the client, where the redirection message includes an identifier of the second server and a second source node list; and the second server is configured to receive the second cost request message; calculate a cost between each source node in the second source node list and each candidate node in the second candidate node list according to the cost type; and return a second cost response message to the first server, where the second cost response message includes a second cost list.

Network traffic management and optimization are implemented by using the technical solutions provided in the present invention, in which a cost between nodes is acquired from servers hierarchically deployed by an ISP and used as a basis for selecting a destination node.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following embodiments describe the specific implementation process of the present invention with the help of examples. Apparently, the embodiments described below are a part rather than all of the embodiments of the present invention. All other embodiments obtained by persons of ordinary skill in the art based on the embodiments of the present invention without creative efforts shall fall within the protection scope of the present invention.

Figure 1:
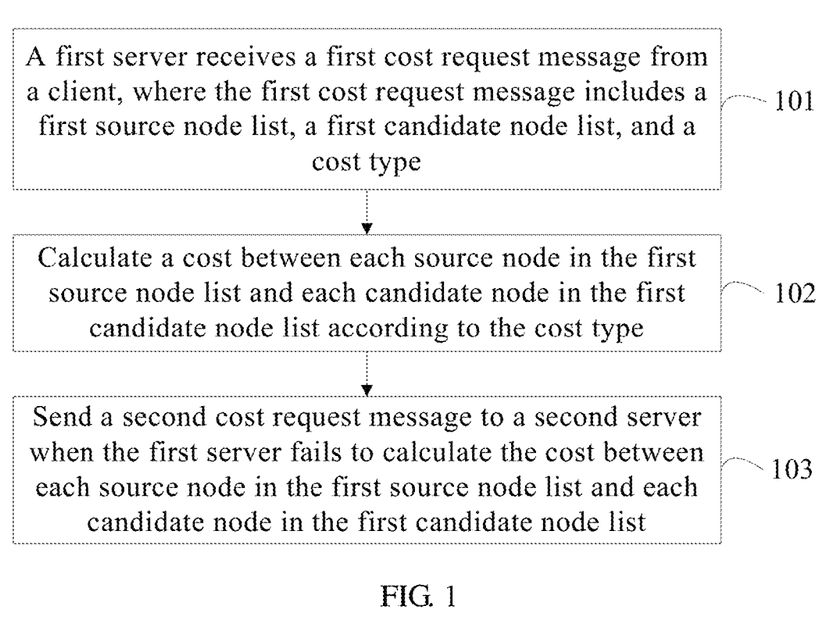
FIG. 1 is a flowchart of a method for acquiring a cost between nodes according to an embodiment of the present invention.

Refer to FIG. 1, which is a flowchart of a method for acquiring a cost between nodes according to an embodiment of the present invention. The method includes:

101: A first server receives a first cost request message from a client, where the first cost request message includes a first source node list, a first candidate node list, and a cost type.

The client is deployed by an ISP and receives, from an upper-layer application such as a P2P application, a request for calculating a cost between nodes.

The client may maintain a first server information table, where the first server information table includes a mapping between an identifier of the first server and a community identifier, and the community identifier may be an address prefix of an Internet Protocol (English: Internet Protocol, IP) address, or may be a domain name suffix.

The first source node list and the candidate node list may include IP addresses of nodes or domain names of the nodes.

Before sending the first cost request message, the client may query the first server information table according to a source node address to acquire the identifier of the first server.

The cost type includes an autonomous system (English: Autonomous System, AS) hop count, a router hop count, network delay, a packet loss rate, network bandwidth, sequencing, and the like.

The first server and a second server may be deployed hierarchically. A routing domain corresponding to the second server is a subdomain of a routing domain corresponding to the first server. The routing domain may include an AS, an open shortest path first (English: Open Shortest Path First, OSPF) domain, an intermediate system-intermediate system (English: Intermediate System-Intermediate System, ISIS) domain, and the like. For example, the first server corresponds to an autonomous system AS and may collect and maintain topology information of the AS, such as Border Gateway Protocol (English: Border Gateway Protocol, BGP) routing information; and the second server corresponds to a region (English: Region) in the AS and may collect and maintain topology information of the Region, such as Interior Gateway Protocol (English: Interior Gateway Protocol, IGP) routing information.

The routing domain corresponding to the first server and the routing domain corresponding to the second server may also be a same routing domain or routing domains at a same level. The routing domain may include an AS, an OSPF domain, an ISIS domain, and the like. For example, the first server corresponds to a first AS and maintains topology information of the first AS; and the second server corresponds to a second AS and may maintain topology information of the second AS.

102: Calculate a cost between each source node in the first source node list and each candidate node in the first candidate node list according to the cost type.

When the first server has calculated the cost between each source node in the first source node list and each candidate node in the first candidate node list, the first server returns a first cost response message to the client, where the first cost response message includes a first cost list, and the first cost list includes a source node in the first source node list, a candidate node in the first candidate node list, and a corresponding cost. For example, the first source node list is {src1(10.102.81.55), src2(10.102.41.73), src3 (10.138.111.80)}, the first candidate node list is {candi1 (11.112.38.22), candi2(12.168.28.64), candi3 (12.168.21.68), candi4(16.122.111.13)}, and the cost type is an AS hop count; the first cost list calculated by the first server according to the cost type and maintained BGP topology information is {(src1,candi1,1) (src1,candi2,2) (src1,candi3,2) (src1,candi4,4) (src2,candi1,1) (src2,candi2,2) (src2,candi3,2) (src2,candi4,4) (src3,candi1,1) (src3,candi2,2) (src3,candi3,2) (src3,candi4,4)}.

The first cost request message may further include a filtering rule. For example, the AS hop count is less than 3, the network delay is less than 200 ms, the cost ranks in top 3 in ascending order, and so on.

The first server may filter the first cost list according to the filtering rule and return the filtered first cost list to the client. As shown in the preceding example, the first cost list that is filtered and returned is {(src1,candi1,1) (src1,candi2,2) (src1,candi3,2) (src2,candi1,1) (src2,candi2,2) (src2,candi3, 2) (src3,candi1,1) (src3,candi2,2) (src3,candi3,2)}.

103: Send a second cost request message to the second server when the first server fails to complete the calculation of the cost between each source node in the first source node list and each candidate node in the first candidate node list, where the second cost request message includes a second source node list, a second candidate node list, and the cost type.

The failing to complete, by the first server, the calculation of the cost between each source node in the first source node list and each candidate node in the first candidate node list may be that the first server fails to calculate the cost type, or may be that the first server fails to calculate costs between a part of or all source nodes and a part of or all candidate nodes.

The second source node list may be a subset or a whole set of the first source node list. The second candidate node list may be a subset or a whole set of the first candidate node list.

Before sending a second cost request message to the second server, the first server may acquire an identifier of the second server and the corresponding second source node list according to an identifier of a source node for which a cost cannot be calculated in the first source node list and a subordinate server information table. The first server may also acquire an identifier of the second server and the corresponding second source node list according to an identifier of a source node for which a cost cannot be calculated in the first source node list and a peer server information table.

After receiving the second cost request message, the second server may calculate a cost between each source node in the second source node list and each candidate node in the second candidate node list according to the cost type.

When the second server has calculated the cost between each source node in the second source node list and each candidate node in the second candidate node list, the second server returns a second cost response message to the first server, where the second cost response message includes a second cost list, and the second cost list includes a source node in the second source node list, a candidate node in the second candidate node list, and a corresponding cost.

The first server receives the second cost response message and may calculate the first cost list according to the second cost list. The first server may send a first cost response message to the client, where the first cost response message includes the first cost list calculated and obtained according to the second cost list.

For example, the first source node list is {src1 (10.102.81.55), src2(10.102.41.73), src3(10.138.111.80)}, and the first candidate node list is {candi1(10.168.38.22), candi2(10.168.28.64), candi3(10.138.21.68), candi4 (10.138.51.44)}; when the cost type is a router hop count, and network delay between any one of source nodes and any one of candidate nodes cannot be calculated according to network topology information maintained by the first server, the first server acquires the identifier of the second server and the corresponding second source node list according to an address of a source node in the first source node list and a subordinate server information table. For example, the first server includes multiple Regions, an address prefix corresponding to Region1 is 10.102, and an address prefix corresponding to Region2 is 10.138.

The first server sends a second cost request message 1 to a server corresponding to the Region1, where the second cost request message 1 includes a second source node address list 1 {src1(10.102.81.55), src2(10.102.41.73)} and a second candidate node address list 1 {candi1 (10.168.38.22), candi2(10.168.28.64), candi3 (10.138.21.68), candi4(10.138.51.44)}, and the cost type is network delay. The first server sends a second cost request message 2 to a server corresponding to the Region2, where the second cost request message 2 includes a second source node address list 2 {src3(10.138.111.80)} and a second candidate node address list 2 {candi1(10.168.38.22), candi2 (10.168.28.64), candi3(10.138.21.68), candi4(10.138.51.44) }, and the cost type is network delay.

The server corresponding to the Region1 performs a calculation to obtain a second cost list 1 {(src1,candi1,250 ms) (src1,candi2,235 ms) (src1,candi3,150 ms) (src1,candi4, 165 ms) (src2,candi1,255 ms) (src2,candi2,250 ms) (src2, candi3,175 ms) (src2,candi4,185 ms)} according to the second cost request message 1 and maintained topology information.

The server corresponding to the Region2 performs a calculation to obtain a second cost list 2 {(src3,candi1,190 ms) (src3,candi2, 185 ms) (src3,candi3,120 ms) (src3, candi4, 100 ms)} according to the second cost message 2 and maintained topology information.

The second servers, that is the server corresponding to the Region1, and the server corresponding to the Region2 separately return the second cost list 1 and the second cost list 2 to the first server. The first server uses the second cost list 1 and the second cost list 2 to update the first cost list and obtains an updated first cost list {(src1,candi1,250 ms) (src1,candi2, 235 ms) (src1,candi3,150 ms) (src1,candi4, 165 ms) (src2,candi1, 255 ms) (src2,candi2, 250 ms) (src2, candi3, 175 ms) (src2,candi4, 185 ms) (src3,candi1,190 ms) (src3,candi2, 185 ms) (src3,candi3,120 ms) (src3,candi4, 100 ms)}. The first server returns the updated first cost list to the client.

For another example, the first source node list is {src1 (10.102.81.55), src2(10.138.111.80)}, the first candidate node list is {candi1(11.168.38.22), candi2(10.138.28.64), candi3(10.102.21.68), candi4(10.112.21.68), candi5 (16.122.111.13)}, and the cost type is sequencing in ascending order; the first server has calculated a part of costs according to the cost type and maintained topology information to obtain the first cost list {(src1,candi2,0) (src1, candi3,0) (src1,candi4,0) (src1,candi1,1) (src1,candi5,4), (src2,candi2,0) (src2,candi3,0) (src2,candi4,0) (src2,candi1, 1) (src2,candi5,4)}.

The first server fails to calculate costs between the source node src1 and the candidate nodes candi2, candi3, and candi4 and costs between the source node src2 and the candidate nodes candi2, candi3, and candi4. The first server acquires the identifier of the second server and the corresponding second source node list according to an address of a source node in the first source node list and a subordinate server information table. For example, the first server includes multiple Regions, an address prefix corresponding to Region1 is 10.102, and an address prefix corresponding to Region2 is 10.138.

The first server sends another second cost request message 1 to a server corresponding to the Region1, where the second cost request message 1 includes a second source node address list 1 {src1(10.102.81.55)} and a second candidate node address list 1 {candi2(10.138.28.64), candi3 (10.102.21.68), candi4(10.112.21.68)}, and the cost type is sequencing in an ascending order. The first server sends another second cost request message 2 to a server corresponding to the Region2, where the second cost request message 2 includes a second source node address list 2 {src3(10.138.111.80)} and a second candidate node address list 2 {candi2(10.138.28.64), candi3(10.102.21.68), candi4 (10.112.21.68)}, and the cost type is sequencing in an ascending order.

The server corresponding to the Region1 performs a calculation to obtain a second cost list 1 {(src1,candi3,0) (src1,candi4,0.1) (src1,candi2,0.3)} according to the another second cost message 1 and maintained topology information.

The server corresponding to the Region2 performs a calculation to obtain a second cost list 2 {(src2,candi2,0) (src2,candi4,0.2) (src2,candi3,0.3)} according to the another second cost message 2 and maintained topology information.

The second server, the server corresponding to the Region1, and the server corresponding to the Region2 separately return the second cost list 1 and the second cost list 2 to the first server. The first server uses the second cost list 1 and the second cost list 2 to update the first cost list and obtains an updated first cost list {(src1,candi3,0) (src1,candi4,0.1) (src1,candi2,0.3) (src1,candi1,1) (src1,candi5, 4), (src2,candi2,0) (src2,candi4,0.2) (src2,candi3,0.3) (src2,candi1,1) (src2,candi5,4)}. The first server returns the updated first cost list to the client.

The first cost request message may further include a cost direction identifier. For example, the cost direction identifier may be set as uplink, which indicates that a cost from each source node in the first source node list to each candidate node in the first candidate node list is calculated; the cost direction identifier may also be set as downlink, which indicates that a cost from each candidate node in the first candidate node list to each source node in the first source node list is calculated.

The second cost request message may further include a cost direction identifier.

When the second server fails to complete the calculation of the cost between each source node in the second source node list and each candidate node in the second candidate node list, the second server sends a third cost request message to a third server, where the third cost request message includes a third source node list, a third candidate node list, and the cost type, and so on.

Figure 2:
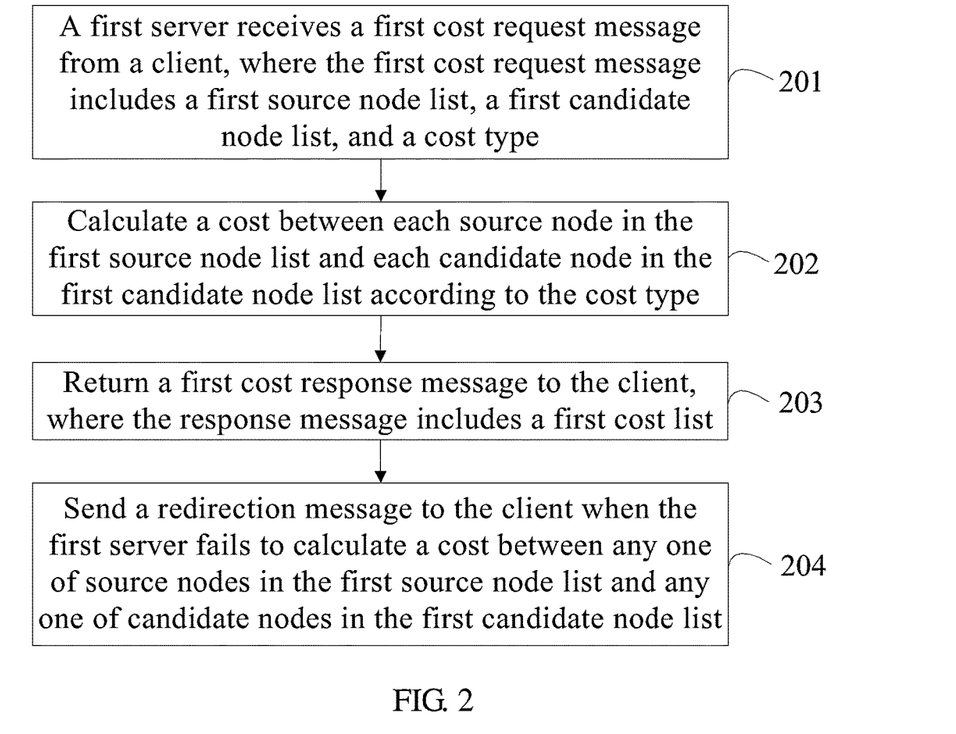
FIG. 2 is a flowchart of another method for acquiring a cost between nodes according to an embodiment of the present invention.

Refer to FIG. 2, which is a flowchart of another method for acquiring a cost between nodes according to an embodiment of the present invention. The method includes:

201: A first server receives a first cost request message from a client, where the first cost request message includes a first source node list, a first candidate node list, and a cost type.

The client is deployed by an ISP and receives, from an upper-layer application such as a P2P application, a request for calculating a cost between nodes.

The client may maintain a first server information table, where the first server information table includes a mapping between an identifier of the first server and a community identifier, and the community identifier may be an IP address prefix, or may be a domain name suffix.

The first source node list and the candidate node list may include IP addresses of nodes or domain names of the nodes.

Before sending the first cost request message, the client may query the first server information table according to a source node address to acquire the identifier of the first server.

The cost type includes an AS hop count, a router hop count, network delay, a packet loss rate, network bandwidth, sequencing, and the like.

202: Calculate a cost between each source node in the first source node list and each candidate node in the first candidate node list according to the cost type.

203: Return a first cost response message to the client, where the first cost response message includes a first cost list, and the first cost list includes a source node and a candidate node for which a cost can be calculated by the first server and a corresponding cost.

The first server calculates the cost between each source node in the first source node list and each candidate node in the first candidate node list according to the cost type and obtains the first cost list, where the first cost list includes a source node and a candidate node for which a cost has been calculated by the first server and a corresponding cost.

The first server returns the first cost response message to the client, where the first cost response message includes the first cost list.

The first cost request message may further include a filtering rule. For example, the AS hop count is less than 3, the network delay is less than 200 ms, the cost ranks in top 3 in ascending order, and so on.

The first server may further calculate a cost between a source node in the first source node list and a candidate node in the first candidate node list according to the cost type and the filtering rule to obtain the first cost list.

204: Send a redirection message to the client when the first server fails to complete the calculation of the cost between each source node in the first source node list and each candidate node in the first candidate node list, where the redirection message includes an identifier of a second server and a second source node list.

The second source node list may be a subset or a whole set of the first source node list. A second candidate node list may be a subset or a whole set of the first candidate node list.

The first server and the second server may be deployed hierarchically. A routing domain corresponding to the second server is a subdomain of a routing domain corresponding to the first server. The routing domain may include an AS, an OSPF domain, an ISIS domain, and the like. For example, the first server corresponds to an autonomous system AS and may collect and maintain topology information of the AS, such as BGP routing information; and the second server corresponds to a region Region in the AS and may collect and maintain topology information of the Region, such as IGP routing information.

The routing domain corresponding to the first server and the routing domain corresponding to the second server may also be a same routing domain or routing domains at a same level. The routing domain may include an AS, an OSPF domain, an ISIS domain, and the like. For example, the first server corresponds to a first AS and maintains topology information of the first AS; and the second server corresponds to a second AS and may maintain topology information of the second AS.

Before sending the redirection message to the client, the first server may acquire an identifier of the second server and the corresponding second source node list according to an identifier of a source node for which a cost cannot be calculated in the first source node list and a subordinate server information table. The first server may also acquire an identifier of the second server and the corresponding second source node list according to an identifier of a source node for which a cost cannot be calculated in the first source node list and a peer server information table.

The redirection message may further include the second candidate node list.

After receiving the redirection message, the client may send a second cost request message to the second server, where the second cost request message includes a second source node list, a second candidate node list, and the cost type.

When the second server fails to complete the calculation of a cost between each source node in the second source node list and each candidate node in the second candidate node list, a second redirection message may further be sent to the client, where the second redirection message includes an identifier of a third server and a corresponding third source node list, and so on.

Network traffic management and optimization are implemented by using the technical solution provided in the embodiment of the present invention, in which a cost between nodes is acquired from servers hierarchically deployed by an Internet service provider ISP and used as a basis of node selection.

Figure 3:
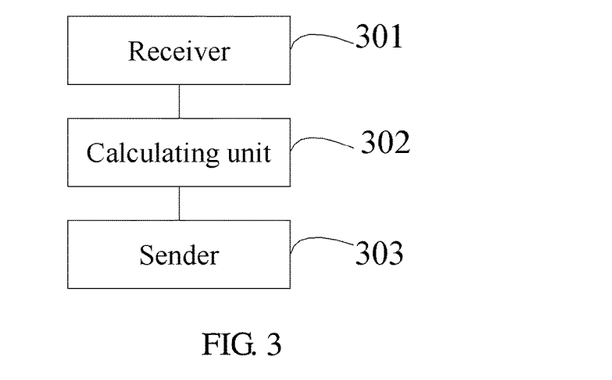
FIG. 3 is a block diagram of a device for acquiring a cost between nodes according to an embodiment of the present invention.

Refer to FIG. 3, which is a block diagram of a device for acquiring a cost between nodes according to an embodiment of the present invention. The device includes a receiver 301, a calculating unit 302, and a sender 303, where:

the receiver 301 is configured to receive a first cost request message from a client, where the first cost request message includes a first source node list, a first candidate node list, and a cost type;

the calculating unit 302 is configured to calculate a cost between each source node in the first source node list and each candidate node in the first candidate node list according to the cost type; and the sender 303 is configured to send a first cost response message to the client, where the first cost response message includes a first cost list, and the first cost list includes a source node in the first source node list, a candidate node in the first candidate node list, and a corresponding cost; and further configured to send a second cost request message to a second server, where the second cost request message includes a second source node list, a second candidate node list, and the cost type; or send a redirection message to the client, where the redirection message includes an identifier of the second server and a second source node list.

The device may further include:

a querying unit 304, configured to acquire the identifier of the second server and the corresponding second source node list according to an identifier of a source node for which a cost cannot be calculated in the first source node list and a subordinate server information table; or acquire the identifier of the second server and the corresponding second source node list according to an identifier of a source node for which a cost cannot be calculated in the first source node list and a peer server information table.

The receiver 301 is further configured to receive a second cost response message from the second server, where the second cost response message includes a second cost list, and the second cost list includes a source node in the second source node list, a candidate node in the second candidate node list, and a corresponding cost.

The calculating unit 302 is further configured to calculate the first cost list according to the second cost list.

Optionally, the calculating unit 302 is further configured to calculate the cost between each source node in the first source node list and each candidate node in the first candidate node list according to the cost type and a filtering rule.

Figure 4:
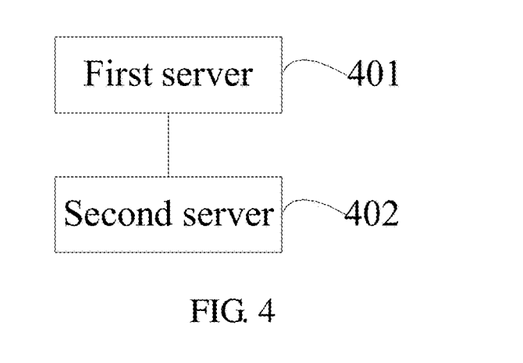
FIG. 4 is a block diagram of a system for acquiring a cost between nodes according to an embodiment of the present invention.

Refer to FIG. 4, which is a schematic diagram of a system for acquiring a cost between nodes according to an embodiment of the present invention. The system includes a first server 401 and a second server 402, where:

the first server 401 is configured to receive a first cost request message from a client, where the first cost request message includes a first source node list, a first candidate node list, and a cost type; calculate a cost between each source node in the first source node list and each candidate node in the first candidate node list according to the cost type; and send a first cost response message to the client, where the first cost response message includes a first cost list, and the first cost list includes a source node in the first source node list, a candidate node in the first candidate node list, and a corresponding cost; and is further configured to send a second cost request message to the second server 402 when the first server 401 fails to complete the calculation of the cost between each source node in the first source node list and each candidate node in the first candidate node list, where the second cost request message includes a second source node list, a second candidate node list, and the cost type; or send a redirection message to the client, where the redirection message includes an identifier of the second server and a second source node list; and the second server 402 is configured to receive the second cost request message; calculate a cost between each source node in the second source node list and each candidate node in the second candidate node list according to the cost type; and return a second cost response message to the first server 401, where the second cost response message includes a second cost list.

The system may further include:

a client 403, configured to acquire an identifier of the first server 401 and the first source node list according to a source node address and a first server information table and send the first cost request message to the first server 401.

The client 403 may maintain a first server information table, where the first server information table includes a mapping between an identifier of the first server and a community identifier, and the community identifier may be an IP address prefix, or may be a domain name suffix.

The first server 401 and the second server 402 may be deployed hierarchically. A routing domain corresponding to the second server 402 is a subdomain of a routing domain corresponding to the first server 401. Accordingly, the first server 401 is further configured to: before sending the second cost request message to the second server 402 or sending the redirection message to the client 403, acquire the identifier of the second server and the corresponding second source node list according to an identifier of a source node for which a cost cannot be calculated in the first source node list and a subordinate server information table.

The routing domain corresponding to the first server 401 and the routing domain corresponding to the second server 402 may also be a same routing domain or routing domains at a same level. Accordingly, the first server 401 is further configured to: before sending the second cost request message to the second server 402 or sending the redirection message to the client 403, acquire the identifier of the second server and the corresponding second source node list according to an identifier of a source node for which a cost cannot be calculated in the first source node list and a peer server information table.

The client 403 is further configured to send a second cost request message to the second server 402 after receiving the redirection message.

The first server 401 is further configured to calculate the cost between each source node in the first source node list and each candidate node in the first candidate node list according to the cost type and a filtering rule.

The system may further include a third server 404.

When the second server 402 fails to complete the calculation of the cost between each source node in the second source node list and each candidate node in the second candidate node list, the second server 402 sends a third cost request message to the third server 404, where the third cost request message includes a third source node list, a third candidate node list, and the cost type. Similarly, the system may further include a fourth server, a fifth server, and the like.

Figure 5:
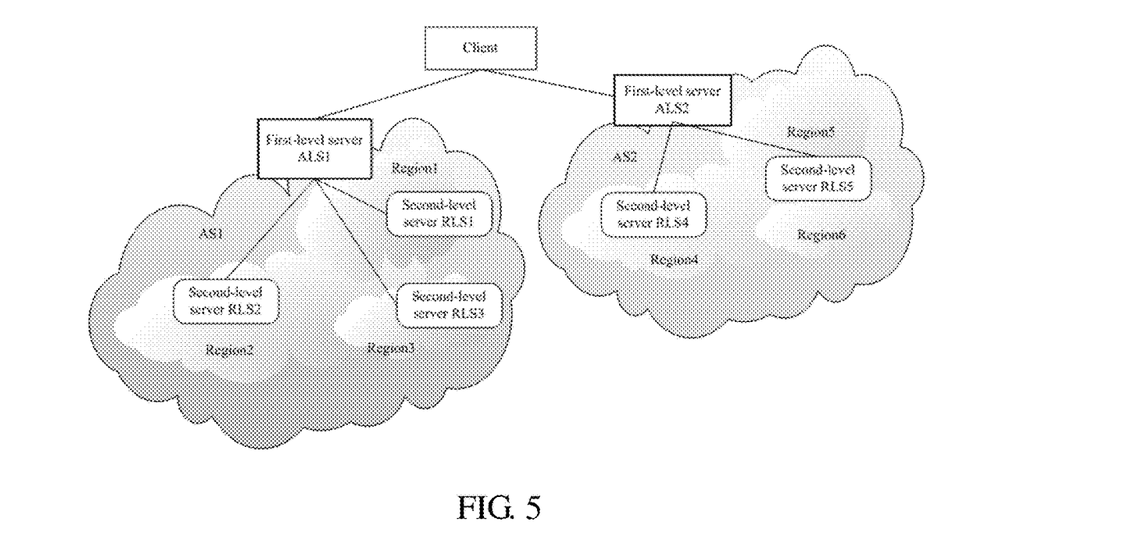
FIG. 5 is a schematic diagram of a hierarchically deployed server system according to an embodiment of the present invention.

For example, refer to FIG. 5, which is a schematic diagram of a hierarchically deployed server system according to an embodiment of the present invention. A first-level server ALS1 corresponds to AS1 and maintains topology information of the AS1; and a first-level server ALS2 corresponds to AS2 and maintains topology information of the AS2. A second-level server RLS1 corresponds to Region1 and maintains topology information of the Region1; a second-level server RLS2 corresponds to Region2 and maintains topology information of the Region2; a second-level server RLS3 corresponds to Region3 and maintains topology information of the Region3; a second-level server RLS4 corresponds to Region4 and maintains topology information of the Region4; RLS5 corresponds to Region5 and Region6 and maintains topology information of the Region 5 and Region 6. A client maintains a first server information table, which includes a mapping between an identifier of a first-level server and an IP address prefix. A first-level server maintains a peer server information table, which includes a mapping between an identifier of a first-level server and an IP address prefix. The first-level server further maintains a subordinate server information table, which includes a mapping between an identifier of a second-level server in an AS corresponding to the first-level server and an address prefix. A second-level server maintains a peer server information table, which includes mappings between identifiers of second-level servers in a same AS and IP address prefixes. Peer servers may be deployed and maintained by using a P2P method such as DHT or a client-server (English: Client-Server, C/S) method. The hierarchically deployed server system provided in this embodiment of the present invention is not limited to two layers.

Network traffic management and optimization are implemented by using the technical solution provided in this embodiment of the present invention, in which a cost between nodes is acquired from servers hierarchically deployed by an Internet service provider ISP and used as a basis of node selection.

Persons of ordinary skill in the art may understand that all or a part of the steps in the method embodiments may be implemented by a program instructing relevant hardware. The program may be stored in a computer readable storage medium. When the program is run, the steps in the method embodiments are performed. The storage medium may be any medium that is capable of storing program codes, such as a ROM, a RAM, a magnetic disk, or an optical disk.

The foregoing descriptions are merely specific exemplary embodiments of the present invention, but are not intended to limit the protection scope of the present invention. Any variation or replacement that can be easily figured out by persons skilled in the art within the technical scope disclosed in the present invention shall fall within the protection scope of the present invention. Therefore, the protection scope of the present invention shall be subject to the protection scope of the claims.

What is claimed is:

1. A method for acquiring a cost between nodes, comprising:
   receiving, by a first server, a first cost request message from a client, wherein the first cost request message comprises a first source node list, a first candidate node list, and a cost type, and wherein the cost type comprises at least one of: an autonomous system (AS) hop count, a router hop count, network delay, a packet loss rate, network bandwidth and sequencing;
   calculating a cost between each source node in the first source node list and each candidate node in the first candidate node list according to the cost type;
   sending a second cost request message to a second server when the first server fails to complete the calculation of the cost between at least one source node in the first source node list and at least one candidate node in the first candidate node list, wherein the second cost request message comprises a second source node list, a second candidate node list, and the cost type, and wherein the second source node list is a subset of the first source node list, and the second candidate node list is a subset or a whole set of the first candidate node list;
   receiving a second cost response message from the second server, wherein the second cost response message comprises a second cost list, and the second cost list comprises a list of cost items, each cost item comprises a source node in the second source node list, a candidate node in the second candidate node list, and a corresponding cost;
   calculating a first cost list according to the second cost list, and sending a first cost response message to the client, wherein the first cost response message comprises the first cost list,
   wherein the first cost list is used by the client to select a destination node to manage and optimize network traffic.

2. The method according to claim 1, wherein the first server and the second server are deployed hierarchically, and a routing domain corresponding to the second server is a subdomain of a routing domain corresponding to the first server.

3. The method according to claim 2, before sending a second cost request message to a second server, further comprising:
   acquiring, by the first server, an identifier of the second server and the second source node list according to an identifier of a source node for which a cost cannot be calculated in the first source node list and a subordinate server information table.

4. The method according to claim 1, wherein a routing domain corresponding to the first server and a routing domain corresponding to the second server are a same routing domain or routing domains at a same level.

5. The method according to claim 4, before sending a second cost request message to a second server, further comprising:
   acquiring, by the first server, an identifier of the second server and the second source node list according to an identifier of a source node for which a cost cannot be calculated in the first source node list and a peer server information table.

6. The method according to claim 1, wherein the first cost request message further comprises a filtering rule; and
   accordingly, the first server calculates the cost between each source node in the first source node list and each candidate node in the first candidate node list according to the cost type and the filtering rule.

7. A method for acquiring a cost between nodes, comprising:
- receiving, by a first server, a first cost request message from a client, wherein the first cost request message comprises a first source node list, a first candidate node list, and a cost type, and wherein the cost type comprises at least one of: an autonomous system (AS) hop count, a router hop count, network delay, a packet loss rate, network bandwidth and sequencing;
- calculating a cost between each source node in the first source node list and each candidate node in the first candidate node list according to the cost type;
- returning a first cost response message to the client, wherein the first cost response message comprises a first cost list, and the first cost list comprises a list of cost items, each cost item comprises a source node and a candidate node for which a cost is calculated by the first server and a corresponding cost; and
- sending a redirection message to the client when the first server fails to complete the calculation of the cost between at least one source node in the first source node list and at least one candidate node in the first candidate node list, wherein the redirection message comprises an identifier of a second server and a second source node list, wherein the second source node list is a subset of the first source node list, wherein the first cost list is used by the client to select a destination node to manage and optimize network traffic.

8. The method according to claim 7, wherein the first server and the second server are deployed hierarchically, and a routing domain corresponding to the second server is a subdomain of a routing domain corresponding to the first server.

9. The method according to claim 8, before sending a redirection message to the client, further comprising:
- acquiring, by the first server, an identifier of the second server and the second source node list according to an identifier of a source node in a set of a source node and candidate node pair for which a cost cannot be calculated and a subordinate server information table.

10. The method according to claim 7, wherein a routing domain corresponding to the first server and a routing domain corresponding to the second server are a same routing domain or routing domains at a same level.

11. The method according to claim 10, before sending a redirection message to the client, further comprising:
- acquiring, by the first server, an identifier of the second server and the second source node list according to an identifier of a source node for which a cost cannot be calculated in the first source node list and a peer server information table.

12. The method according to any one of claim 7, wherein the first cost request message further comprises a filtering rule; and accordingly, the first server calculates the cost between each source node in the first source node list and each candidate node in the first candidate node list according to the cost type and the filtering rule.

13. A device for acquiring a cost between nodes, comprising:
- memory storing a computer program; and
- a processor coupled to the memory, wherein
- when the processor executes the computer program, the device is configured to:
  - receive a first cost request message from a client, wherein the first cost request message comprises a first source node list, a first candidate node list, and a cost type, and wherein the cost type comprises at least one of: an autonomous system (AS) hop count, a router hop count, network delay, a packet loss rate, network bandwidth and sequencing;
  - calculate a cost between each source node in the first source node list and each candidate node in the first candidate node list according to the cost type; and
  - send a first cost response message to the client, wherein the first cost response message comprises a first cost list, and the first cost list comprises a list of cost items, each item comprises a source node in the first source node list, a candidate node in the first candidate node list, and a corresponding cost; and
- the device is further configured to:
  - either send a second cost request message to a second server, wherein the second cost request message comprises a second source node list, a second candidate node list, and the cost type, and wherein the second source node list is a subset of the first source node list, and the second candidate node list is a subset or a whole set of the first candidate node list,
  - or create and send a redirection message to the client, wherein the redirection message comprises an identifier of the second server and a second source node list, and wherein the second source node list is the subset of the first source node list, and the second candidate node list is a subset or a whole set of the first candidate node list; and
- wherein the first cost list is used by the client to select a destination node to manage and optimize network traffic.

14. The device according to claim 13, wherein the device is further configured to acquire the identifier of the second server and the corresponding second source node list according to an identifier of a source node for which a cost cannot be calculated in the first source node list and a subordinate server information table; or acquire the identifier of the second server and the corresponding second source node list according to an identifier of a source node for which a cost cannot be calculated in the first source node list and a peer server information table.

15. The device according to claim 13, wherein the device is further configured to:
- receive a second cost response message from the second server, wherein the second cost response message comprises a second cost list, and the second cost list comprises a list of second cost items, each second cost item comprises a source node in the second source node list, a candidate node in the second candidate node list, and a corresponding cost; and
- calculate the first cost list according to the second cost list.

16. A system for acquiring a cost between nodes, comprising:
- a first hardware server; and
- a second hardware server, wherein:
- the first hardware server is configured to:
  - receive a first cost request message from a client, wherein the first cost request message comprises a first source node list, a first candidate node list, and a cost type, and wherein the cost type comprises at least one of: an autonomous system (AS) hop count, a router hop count, network delay, a packet loss rate, network bandwidth and sequencing;
  - attempt to calculate a cost between each source node in the first source node list and each candidate node in the first candidate node list according to the cost type; and send a first cost response message to the client, wherein the first cost response message comprises a first cost list, and the first cost list comprises a list of cost items, each cost item comprises a source node in the first source node list, a candidate node in the first candidate node list, and a corresponding cost; and the first hardware server is further configured to:

either send a second cost request message to the second hardware server when the first hardware server fails to complete the calculation of the cost between at least one source node in the first source node list and at least one candidate node in the first candidate node list, wherein the second cost request message comprises a second source node list, a second candidate node list, and the cost type, and wherein the second source node list is a subset of the first source node list, and the second candidate node list is a subset or a whole set of the first candidate node list;

or send a redirection message to the client, wherein the redirection message comprises an identifier of the second hardware server and a second source node list; and the second hardware server is configured to receive the second cost request message;

calculate a cost between each source node in the second source node list and each candidate node in the second candidate node list according to the cost type; and return a second cost response message to the first hardware server, wherein the second cost response message comprises a second cost list; and wherein the first cost list and the second cost list are used by the client to select a destination node to manage and optimize network traffic.

17. The system according to claim 16, wherein the system further comprises a client, and the client is configured to acquire an identifier of the first hardware server and the first source node list according to an identifier of a source node and a first server information table and send the first cost request message to the first hardware server.

18. The system according to claim 16, wherein:

the first hardware server and the second hardware server are deployed hierarchically, and a routing domain corresponding to the second hardware server is a subdomain of a routing domain corresponding to the first hardware server; alternatively, the routing domain corresponding to the first hardware server and the routing domain corresponding to the second hardware server are a same routing domain or routing domains at a same level.

19. The system according to claim 16, wherein the first hardware server is further configured to calculate the cost between each source node in the first source node list and each candidate node in the first candidate node list according to a filtering rule and the cost type.

* * * * *